United States Patent [19]

Lee, Jr.

[11] Patent Number: 4,588,764

[45] Date of Patent: May 13, 1986

[54] COMPOSITIONS OF POLYPHENYLENE ETHER RESIN AND DIPHOSPHITES

[75] Inventor: Gim F. Lee, Jr., Albany, N.Y.

[73] Assignee: General Electric Company, Pittsfield, Mass.

[21] Appl. No.: 641,573

[22] Filed: Aug. 16, 1984

[51] Int. Cl.$^4$ .......................... C08K 5/52; C08L 71/04
[52] U.S. Cl. .................... 524/128; 524/120; 524/504; 524/508; 524/611
[58] Field of Search ................ 524/128, 120, 611

[56] References Cited

U.S. PATENT DOCUMENTS

| | | | |
|---|---|---|---|
| 3,375,304 | 3/1968 | Larrison | 524/128 |
| 3,419,524 | 12/1968 | Larrison | 524/128 |
| 3,501,430 | 3/1970 | Weisfeld | 524/128 |
| 3,639,334 | 2/1972 | Holoch . | |
| 3,761,541 | 9/1973 | Katchman et al. . | |
| 3,928,505 | 12/1975 | Klicker | 524/120 |
| 3,952,072 | 4/1976 | Yonemitsu et al. . | |
| 4,154,775 | 5/1979 | Axelrod . | |
| 4,162,278 | 7/1979 | Granzow | 524/120 |
| 4,180,498 | 12/1979 | Spivack | 524/120 |
| 4,233,199 | 11/1980 | Abolins | 524/139 |
| 4,405,739 | 9/1983 | Kinson . | |
| 4,427,814 | 1/1984 | Sugio | 525/135 |
| 4,472,546 | 9/1984 | Sugio | 524/128 |

*Primary Examiner*—C. Warren Ivy
*Attorney, Agent, or Firm*—Hedman, Gibson, Costigan & Hoare

[57] ABSTRACT

Thermoplastic blends of a polyphenylene ether resin, alone or together with supplementary polymers, and a diphosphite compound or compounds are described. The blends exhibit good processability and initial color and are moldable into articles of various shapes and sizes.

12 Claims, No Drawings

COMPOSITIONS OF POLYPHENYLENE ETHER RESIN AND DIPHOSPHITES

BACKGROUND OF INVENTION

The polyphenylene ether resins and blends prepared from such polymers have become well known in the art of engineering plastics. These materials can be fabricated, as by molding, into a wide variety of consumer and industrial products which are characterized by good electrical, mechanical, chemical and physical properties. The polyphenylene ether resins and methods of their preparation are described extensively in the patent literature, including Hay, U.S. Pat. Nos. 3,306,874 and 3,306,875 and Stamatoff, U.S. Pat. Nos. 3,257,357 and 3,257,358.

The prior art discloses various additives for affecting the properties of polyphenylene ether resin blends. These include aromatic phosphates, e.g., triphenyl phosphate, which is often employed in such compositions to impart flame retardancy and, in larger amounts, to provide a plasticizing function as well. Haaf and Lee, Jr. in U.S. Pat. No. 4,313,864 describe thermoplastic compositions of a polyphenylene ether resin, a plasticizer, such as an aromatic phosphate, and a minor amount of a hydrogenated radial teleblock copolymer.

Another development is the use of certain cyclic phosphates, for example, diphenyl pentaerythritol diphosphate, as a flame retardant agent for polyphenylene ether resins, as is described by Axelrod in U.S. Pat. No. 4,254,775.

Other known additives are stabilizers for increasing the resistance of polyphenylene ether resins against color formation due to the degradative effects of heat or light. Many such stabilizers are founded on the chemical element phosphorus. Holoch, U.S. Pat. No. 3,639,334 discloses various phosphite compounds which serve to reduce color formation where the polyphenylene ether resin is exposed to an oxidizing atmosphere at an elevated temperature. Yonemitsu et al. in U.S. Pat. No. 3,952,072 discloses polyphenylene ether blends stabilized with higher molecular weight phosphorus esters, alone or in combination with sterically hindered phenols. Katchman et al., U.S. Pat. No. 3,761,541 describes polyphenylene ether compositions stabilized by the addition of a combination of alkanolamines and organic phosphites. Cyclic phosphites which function as thermal oxidative stabilizers for such polymers are disclosed by Kinson in U.S. Pat. No. 4,405,739.

SUMMARY OF THE INVENTION

This invention provides thermoplastic compositions of (a) a polyphenylene ether resin, alone, or together with a modifying polymer and (b) an amount of one or more diphosphite materials selected from those of the formulae

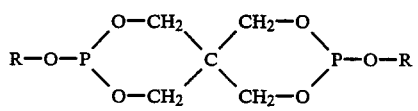

wherein R is $C_1$ to $C_{30}$, and preferably $C_5$ to $C_{25}$ alkyl; and

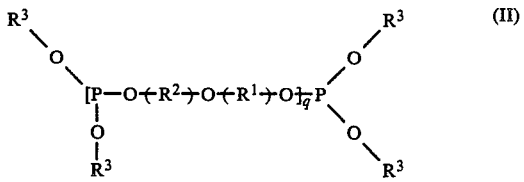

wherein $R^1$ and $R^2$ are independently $C_1$ to $C_{10}$, and preferably $C_1$ to $C_6$ alkylene; $R^3$ is aryl, preferably phenyl; and q represents the total number of dialkyleneglycol units and is an integer from 1 to 15. By way of illustration, within Formula I above R can be methyl, ethyl, propyl, butyl, pentyl, hexyl, octyl, nonyl, decyl, undecanyl, dodecanyl, tridecanyl, tetradecanyl, pentadecanyl, hexadecanyl, heptadecanyl, octadecanyl, nonadecanyl, eicosanyl, and the like. The substituent R can also be branched alkyl, such as isobutyl, isopentyl, neopentyl, isohexyl, 3-methylpentyl, 2,2-dimethylbutyl, 2,3-dimethylbutyl, isodecyl, and the like.

Also by way of illustration, within Formula II above $R^1$ and $R^2$ independently can be methylenyl, ethylenyl, propylenyl, butenyl, hexenyl, heptenyl, octenyl, nonenyl, and decenyl, as well as branched substituents such as isobutylenyl, 3-methyl-1-butenyl, 2-methyl-2-butenyl, 2,3-dimethyl-2-butenyl, and the like. $R^3$ is preferably phenyl.

Relative to corresponding compositions containing the same amount of isopropylated triphenyl phosphate as a phosphorus-containing additive, the present diphosphite-containing compositions exhibit better processability, as indicated by longer flow channel length, and better initial color, as indicated by lower yellowness index.

Component (b), is useful in the present compositions in any amount effective to decrease the initial color of component (a), in the sense that it is less yellow, but preferably is included in amounts from about 5 to 30 parts by weight for each 100 parts of (a).

DETAILED DESCRIPTION OF THE INVENTION

Preferred compositions in accordance with this invention will contain as component (a) polyphenylene ether resins which are homopolymers or copolymers having units of the formula

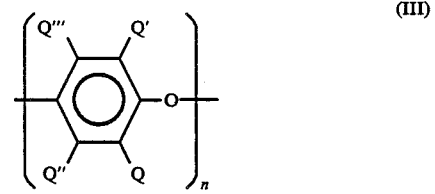

in which Q, Q', Q" and Q"' are independently selected from the group consisting of hydrogen, halogen, hyrocarbon radicals, halohydrocarbon radicals, hydrocarbonoxy radicals, and halohydrocarbonoxy radicals; and n represents the total number of monomer units and is an integer of at least about 20, and more usually at least 50.

In general, such polymers are self-condensation products of monohydric, monocyclic phenols produced by reacting phenolic starting materials with oxygen in the presence of complex metal catalysts, with the molecular weight being controlled by the reaction time, longer times providing a higher average number of repeating units. Particular procedures for preparing polyphenylene ether resins are described in the patent literature, including the above mentioned Hay and Stamatoff patents, the disclosures of which are incorporated herein by reference.

Suitable phenolic monomers include but are not limited to: 2,6-dimethylphenol; 2,6-diethylphenol; 2,6-dibutylphenol; 2,6-dilaurylphenol; 2,6-dipropylphenol; 2,6-diphenylphenol; 2-methyl-6-ethylphenol; 2-methyl-6-cyclohexylphenol; 2-methyl-6-tolylphenol; 2-methyl-6-methoxyphenol; 2-methyl-6-butylphenol; 2,6-dimethoxyphenol; 2,3,6-trimethylphenol; 2,3,5,6-tetramethylphenol; and 2,6-diethoxyphenol.

Some of the polymers which can be produced and which are within the above formula are: poly(2,6-dilauryl-1,4-phenylene)ether; poly(2,6-dimethoxy-1,4-phenylene) ether; poly(2,6-diethoxy-1,4-phenylene)ether; poly(2-methoxy-6-ethoxy-1,4-phenylene)ether; poly(2-ethyl-6-stearyloxy-1,4-phenylene)ether; poly(2,6-dichloro-1,4-phenylene)ether; poly(2-methyl-6-phenyl-1,4-phenylene)ether; poly(2,6-dibenzyl-1,4-phenylene)ether; poly(2-ethoxy-1,4-phenylene)ether; poly(2-chloro-1,4-phenylene)ether; poly(2,6-dibromo-1,4-phenylene)ether; and the like.

Also encompassed within the above formula are polyphenylene ether copolymers. Examples include but are not limited to copolymers of 2,6-dimethylphenol with other phenolics such as 2,3,6-trimethylphenol or 2-methyl-6-butylphenol, that is, poly(2,6-dimethyl-co-2,3,6-trimethylphenol), poly(2,6-dimethyl-co-2-methyl-6-butylphenol), and so forth.

Especially preferred for use in this invention are homopolymers having alkyl substituents in the two positions ortho to the oxygen ether atom, that is, those of the above formula in which Q and Q' are alkyl, and particularly alkyl having from 1 to 4 carbon atoms. Most preferred is poly(2,6-dimethyl-1,4-phenylene)ether.

The polyphenylene ether resins can be and often are used in conjunction with one or more other polymers in this invention to upgrade physical or chemical properties. Thus, component (a) may comprise the polyphenylene ether resin together with, for instance, an alkenyl aromatic resin, a rubber modified high impact alkenyl aromatic resin, or an alkenyl aromatic resin-based copolymer or terpolymer. In general, such polymeric supplements serve to enhance one or more properties of the composition relative to use of the polyphenylene ether resin alone as component (a).

The preferred alkenyl aromatic resins and alkenyl aromatic-based copolymers suitable for use in component (a) are those in which the alkenyl aromatic portion is derived at least in part from compounds of the formula

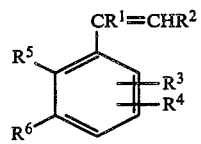

(IV)

wherein $R^1$ and $R^2$ are selected from the group consisting of lower alkyl or alkenyl groups of from 1 to 6 carbon atoms, and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen, halogen, and lower alkyl and alkenyl groups of from 1 to 6 carbon atoms, or $R^5$ and $R^6$ may be concatenated together with hydrocarbyl groups to form a naphthyl group.

Compounds within the above formula include styrene, as well as it homologs and analogs such as alpha-methylstyrene, para-methylstyrene, 2,4-dimethylstyrene, chlorostyrene, dichlorostryene, tribromostyrene, p-tert-butylstyrene, p-ethylstyrene, vinyl xylene, divinylbenzene, and vinyl naphthalene. Styrene is the most preferred for purposes of this invention.

Suitable rubber modifiers, if desired, include natural rubber, as well as synthetic rubbers such as polyisoprene, polybutadiene, polychloroprene, ethylene-propylene-diene terpolymers (EPDM rubber), styrene-butadiene copolymers (SBR rubber), ethylene-propylene copolymers (EPR rubber), acrylonitrile-butadiene, silicone rubbers, and polyurethane rubbers. Linear block and radial teleblock copolymers of styrene and a diene, e.g., butadiene (e.g., AB, ABA, ABAB, etc.), including hydrogenated forms thereof, may also be used.

The polyphenylene ether resins are utilizable with the supplemental polymer or polymers, e.g., alkenyl aromatic resin, in virtually any desired proportion, e.g., in weight ratios between 99:1 and 1:99. In specific cases where an impact modifier is employed, amounts of this material will vary depending on particular requirements, but preferably will range from about 2 to about 15 parts by weight per 100 total parts of component (a).

The compositions of this invention may also be formulated to contain one or more non-resinous supplementary additives, to affect the chemical and/or physical properties. These may be selected from among known agents for polyphenylene ether resins and blends, including but not limited to mineral fillers, such as clay, mica, talc and calcium carbonate; reinforcing agents, such as glass fibers, flakes or spheres, or titanate whiskers; coloring agents, such as pigments or dyes; lubricants; mold release agents; plasticizers; and so forth.

While the present compositions exhibit a degree of flame retardancy, conventional flame retardant agents can be added to enhance this property. In general, such agents will contain chemical elements known for their ability to impart flame resistance, for example, bromine, chlorine, antimony, phosphorus and nitrogen. Suitable types include various aliphatic and aromatic phosphates, phosphonates and phosphites; halogenatedorganic compounds; halogenated organic compounds in admixture with antimony compounds, e.g. antimony oxide; halogen compounds in admixture with phosphorus compounds containing phosphorus-nitrogen bonds; and halogenated oligomers or polymers such as brominated or chlorinated polystyrenes and polycarbonates. Special mention is made of aromatic phosphate flame retardant agents, and particularly triphenyl phosphate or isopropylated triphenyl phosphate.

The compositions of this invention may be prepared in any convenient manner. The ingredients can be dry mixed or solution blended to form a homogenous admixture, which may then be formed into a shaped article by passing the mixture through a twin-screw extruder at a temperature from about 225° to about 325° C., cooling the extrudate, cutting it into molding pellets, and then injection molding the pellets at a temperature from about 200° to about 300° C. (Mold temperature from about 50° to about 100° C.).

The composition can be fashioned into articles, parts and pieces of various shapes and sizes, being useful in general for virtually any of the purposes for which polyphenylene ether resin blends are known. Thus, for instance, the compositions can be processed into personal care products, such as hair curling irons and hair driers; small household appliances, such as coffee makers and clothes irons; major appliances, such as detergent dispensers, ice maker components, drain impellers, motor support housings, compressor covers and air conditioning grilles and fans; automotive parts, such as grilles, headlamp bezels, wheelcovers, exterior decorative trim, pillar and garnish moldings, center consoles, speaker and defogger grilles, panel light clusters, and lamp housings; in business machines, such as housings and internal structural components, e.g., card guides, carriers, frames and brackets; and electrical construction products, such as smoke detectors, intrusion alarms, switches, cable connectors, and ground fault interrupters.

The invention is further illustrated in the following examples, which are set forth for demonstrative purposes and should not be construed as a limitation on the scope of the invention.

EXAMPLES 1-4

Compositions in accordance with the invention were prepared by mixing 80 parts by weight of poly(2,6-dimethyl-1,4-phenylene)ether resin (PPO ®, General Electric Co.), and 20 parts of a diphosphite compound (identified in Table 1 below for each case).

For comparison purposes, other compositions were also prepared but using in place of diphosphite an aromatic phosphate in one instance, an alkyl phosphite in another instance, and an alkyl aryl phosphite in a third instance, in the same amount (20 parts by weight).

All of the resulting blends were processed under the same conditions by extruding at a temperature of 270° C. using a twin screw extruder, and injection molding at a temperature of 260° C. (55° C. mold temperature). The properties were evaluated in accordance with ASTM procedures. The flame retardancy was measured in accordance with Underwriters' Laboratories' Test Bulletin No. 94 (UL-94). The results are reported in Table 1, where the property symbols have the following meanings:

HDT = Heat distortion temperature, in °F., using a ⅛ inch thick test sample.
Izod = Notched Izod impact strength, in ft. lb./in. of notch, using ⅛ inch thick test sample.
F.C. = Injection flow channel length, in inches.
F. C. Ratio = Injection flow channel length normalized to control sample A.
YI = Yellowness index, dimensionless units.
UL-94 = Vertical Burn Test rating.

TABLE 1

| Ex. | Additive | HDT | Izod | F.C. | F.C. Ratio | YI | UL-94 |
|---|---|---|---|---|---|---|---|
| 1 | Diisodecyl pentaerythritol diphosphite[a] | 229 | 0.6 | 26 | 1.70 | 57.1 | V-0 |
| 2 | Distearyl pentaerythritol diphosphite[b] | 209 | 0.5 | 30 | 1.97 | 86.0 | V-0 |
| 3 | Tetraphenyl dipropyleneglycol diphosphite[c] | 226 | 0.6 | 24¼ | 1.59 | 63.8 | V-0 |
| 4 | Poly(dipropyleneglycol) phenyl phosphite[d] | 230 | 0.6 | 22¾ | 1.49 | 60.2 | V-1 |
| A* | Isopropylated triphenyl phosphate[e] | 229 | 0.7 | 15¼ | 1.0 | 139.8 | V-0 |
| B* | Tridecyl phosphite | 203 | 0.6 | 30½ | 2.0 | 79.5 | V-1 |
| C* | Diphenyl decyl phosphite | 207 | 0.6 | 28¼ | 1.85 | 83.3 | V-0 |

[a] Weston ® 600, Borg Warner Corp.
[b] Weston ® 618, Borg Warner Corp.
[c] Weston ® THOP, Borg Warner Corp.
[d] Weston ® DHOP, Borg Warner Corp. The DHOP material typically has 7 repeating units, a refractive index @ 25° C. of 1.5340-1.5380 and a phosphorous content of 11.8%.
[e] Kronitex ® 50, FMC Corp.
*comparison, not in accordance with invention

EXAMPLES 5-8

Using the procedure described in the previous examples, additional compositions in accordance with this invention were prepared and molded from 80 parts by weight of poly(2,6-dimethyl-1,4-phenylene)ether resin (PPO ®), 20 parts by weight of the individual diphosphite compounds listed in Table 2, and 5 parts by weight of a hydrogenated styrene-butadiene-styrene block copolymer (Shell Chemical's KG 1651). Comparison was made with different phosphorus-containing additives as before, in the same amount. The notched Izod impact strength and yellowness index of the molded test samples are reported in Table 2.

TABLE 2

| Example | Additive, 20 pbw | Notched Izod Impact Strength, ft. lb./in. n. | Yellowness Index |
|---|---|---|---|
| 5 | Diisodecyl pentaerythritol diphosphite[a] | 4.5 | 46.4 |
| 6 | Distearyl pentaerythritol disphosphite[b] | 3.7 | 41.2 |
| 7 | Tetraphenyl dipropyleneglycol diphosphite[c] | 5.2 | 49.6 |
| 8 | Poly(dipropyleneglycol) phenyl phosphite[d] | 4.6 | 50.8 |
| D* | Isopropylated triphenyl phosphate[e] | 4.7 | 73.5 |
| E* | Tridecyl phosphite | 6.0 | 42.6 |
| F* | Diphenyl decyl phosphite | 5.5 | 22.9 |

*comparison experiment
[a, b, c, d] and [e] same as in previous examples.

Other variations and modifications of this invention are possible in view of the disclosure which has been provided. For instance, instead of poly(2,6-dimethyl-1,4-phenylene)ether, a copolymer such as poly(2,6-dimethyl-co-2,3,5-trimethyl-1,4-phenylene)ether can be employed. Instead of a hydrogenated styrene-butadiene-styrene block copolymer, an unhydrogenated block copolymer (for example, Shell's Kraton ® rubber) or a radial teleblock copolymer, hydrogenated or unhydrogenated (for example, Phillips' Solprene ® products) can be used. The compositions can be formulated to contain poly(2,6-dimethyl-1,4-phenylene)ether and high impact polystyrene. Glass reinforced or mineral (e.g., clay) filled embodiments are also possible. It should be understood, therefore, that changes may be made in the particular embodiments shown which are within the scope of the invention defined by the appended claims.

I claim:

1. A thermoplastic composition, comprising:
   (a) a polyphenylene ether resin, alone, or in admixture with an alkenyl aromatic resin; and
   (b) an amount of a diphosphite material having the formula

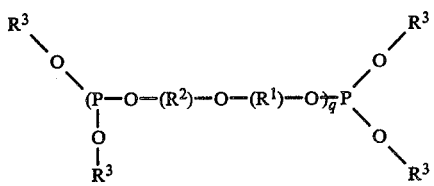

wherein $R^1$ and $R^2$ are independently $C_1$ to $C_{10}$ alkylene; $R^3$ is aryl; and q represents the total number of dialkyleneglycol units and is an integer from 1 to 15, said amount of (b) being effective to reduce the initial yellowness index of (a).

2. A composition according to claim 1, in which component (b) is tetraphenyl dipropyleneglycol diphosphite.

3. A composition according to claim 1, in which component (b) is poly(dipropyleneglycol) phenyl phosphite.

4. A composition according to claim 1, in which the polyphenylene ether resin of component (a) is

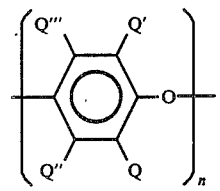

in which Q, Q', Q" and Q'" are independently selected from the group consisting of hydrogen, halogen, hydrocarbon radicals, halohydrocarbon radicals, hydrocarbonoxy radicals, and halohydrocarbonoxy radicals; and n represents the total number of monomer units and is an integer of at least about 20.

5. A composition according to claim 4 in which the polyphenylene ether resin is poly(2,6-dimethyl-1,4-phenylene) ether.

6. A composition according to claim 1, in which the alkenyl aromatic resin is a polystyrene homopolymer.

7. A composition according to claim 1, in which the alkenyl aromatic resin is a rubber modified poly (alkenyl aromatic) resin.

8. A composition according to claim 1, in which the alkenyl aromatic resin is an alkenyl aromatic copolymer or terpolymer.

9. A composition according to claim 1, which further includes one or more non-resinous additives selected from the group consisting of flame retardant agents, plasticizers, mineral fillers, reinforcing agents, coloring agents, mold release agents and lubricants.

10. An article molded from the composition of claim 1.

11. An article molded from the composition of claim 5.

12. A composition according to claim 1, in which component (b) is present in an amount from about 5 to about 30 parts by weight for each 100 parts of (a).

* * * * *